US012489226B2

(12) United States Patent
Wen et al.

(10) Patent No.: US 12,489,226 B2
(45) Date of Patent: Dec. 2, 2025

(54) DUAL-FREQUENCY BAND DUAL-CIRCULARLY POLARIZED ANTENNA AND ANTENNA SYSTEM

(71) Applicant: HUAWEI TECHNOLOGIES CO., LTD., Guangdong (CN)

(72) Inventors: Geyi Wen, Nanjing (CN); Ming Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 18/621,187

(22) Filed: Mar. 29, 2024

(65) Prior Publication Data

US 2024/0275072 A1 Aug. 15, 2024

Related U.S. Application Data

(63) Continuation of application No. PCT/CN2022/117039, filed on Sep. 5, 2022.

(30) Foreign Application Priority Data

Sep. 30, 2021 (CN) .......................... 202111165479.0

(51) Int. Cl.
*H01Q 21/06* (2006.01)
*H01Q 9/04* (2006.01)

(52) U.S. Cl.
CPC ......... *H01Q 21/065* (2013.01); *H01Q 9/0414* (2013.01); *H01Q 9/045* (2013.01)

(58) Field of Classification Search
CPC .... H01Q 21/065; H01Q 9/0414; H01Q 9/045; H01Q 9/0428
See application file for complete search history.

(56) References Cited

U.S. PATENT DOCUMENTS

2005/0088342 A1* 4/2005 Parsche ................ H01Q 9/0464 343/700 MS
2010/0134378 A1* 6/2010 Duchesne ............ H01Q 9/0464 343/872
2017/0040689 A1* 2/2017 Toyao ...................... H01Q 7/00

OTHER PUBLICATIONS

Dineshan Poopalaratnam et al., "Multi-feed Chassis-mode Antenna with Dual-band MIMO operation", May 31, 2014, total 2 pages.

* cited by examiner

*Primary Examiner* — Dieu Hien T Duong

(57) ABSTRACT

A dual-frequency band dual-circularly polarized antenna and an antenna system are disclosed. The antenna includes: a first patch, configured to radiate a high-frequency signal; a second patch, including a radiating element and a ground plate, where the radiating element is configured to radiate a low-frequency signal, the ground plate includes a hollow circle, the radiating element is located in the hollow circle of the ground plate, and the radiating element is an open resonant ring; a microstrip feeder; and a first dielectric substrate, configured to place the second patch and the microstrip feeder, where the first patch is above and spaced apart from the second patch, and the second patch is above the microstrip feeder; and an antenna size is between 0.3λ×0.3λ×0.05, and 0.4λ×0.4λ×0.1λ, and λ is a wavelength corresponding to a lowest operating frequency of the antenna.

16 Claims, 2 Drawing Sheets

DUAL-FREQUENCY BAND DUAL-CIRCULARLY POLARIZED ANTENNA AND ANTENNA SYSTEM

CROSS-REFERENCE TO RELATED APPLICATIONS

This application is a continuation of International Application No. PCT/CN2022/117039, filed on Sep. 5, 2022, which claims priority to Chinese Patent Application No. 202111165479.0, filed on Sep. 30, 2021. The disclosures of the aforementioned applications are hereby incorporated by reference in their entireties.

TECHNICAL FIELD

Embodiments of this application relate to the field of antenna technologies, and more specifically, to a dual-frequency band dual-circularly polarized antenna and an antenna system.

BACKGROUND

With the large-scale development of low earth orbit (LEO) satellite communication, the development trend of satellite user terminals is lightweight and portable. Currently, commercial satellite terminals are large, heavy, and difficult to carry. Therefore, future development of the antenna structures of commercial satellite terminals should focus on a low-profile transmit/receive shared-aperture.

Because a satellite terminal operates in a dual-frequency band dual-circularly polarized mode based on frequency division duplexing (FDD), theoretically, two antenna array planes are required to separately complete receiving and sending. If the two antenna array planes are merged into one array plane, that is, the two antenna array planes have a transmit/receive shared-aperture, for a planar antenna with a large spacing between a high frequency band and a low frequency band, a grating lobe occurs during high frequency band scanning. This affects system performance of the terminal.

Currently, technical solutions such as a reflective array with a transmit/receive shared-aperture and a dual-layer patch structure, can avoid the grating lobe during high frequency band scanning. However, the antenna array has a small array scanning angle and a large size, and cannot implement wide-angle scanning at both the high frequency band and the low frequency band.

SUMMARY

Embodiments of this application provide a dual-frequency band dual-circularly polarized antenna and an antenna system, to increase an array scanning angle, reduce an antenna size, implement wide-angle scanning at a high frequency band and a low frequency band, and implement a dual-frequency band dual-circularly polarization function on a premise that antenna scanning performance is ensured.

According to a first aspect, a dual-frequency band dual-circularly polarized antenna is provided. The antenna includes: a first patch, configured to radiate a high-frequency signal; a second patch, including a radiating element and a ground plate, where the radiating element is configured to radiate a low-frequency signal, the ground plate includes a hollow circle, the radiating element is located in the hollow circle of the ground plate, and the radiating element is an open resonant ring; a microstrip feeder; and a first dielectric substrate, configured to place the second patch and the microstrip feeder, where the first patch is above the second patch, there is a spacing between the first patch and the second patch, and the second patch is above the microstrip feeder; and an antenna size is between 0.3λ×0.3λ×0.05λ and 0.4λ×0.4λ×0.1λ, and λ is a wavelength corresponding to a lowest operating frequency of the antenna.

According to the foregoing three-layer antenna structure, specifically, the antenna includes the first patch, the second patch, and the microstrip feeder. The second patch includes the radiating element and the ground plate. The radiating element is located in the hollow circle included in the ground plate. The radiating element is the open resonant ring. There is the spacing between the first patch and the second patch. The spacing may be air or a specific dielectric substrate. There is the first dielectric substrate between the second patch and the microstrip feeder. The first dielectric substrate is configured to place the second patch and the microstrip feeder. A polarization direction is changed by adjusting an opening position of the open resonant ring, and different high and low frequency bands are obtained by adjusting a size of the open resonant ring. The antenna size is between 0.3λ×0.3λ×0.05, and 0.4λ×0.4λ×0.1λ, and λ is the wavelength corresponding to the lowest operating frequency of the antenna. In this way, this embodiment of this application can increase an array scanning angle, reduce an antenna size, and implement wide-angle scanning at a high frequency band and a low frequency band, and implement a dual-frequency band dual-circularly polarization function on a premise of ensuring antenna scanning performance.

With reference to the first aspect, in some implementations of the first aspect, the antenna further includes a second dielectric substrate, configured to place the first patch and the second patch.

In a manner of stacking the first patch and the second patch, in this embodiment of this application, a size of the dual-frequency band dual-circularly polarized antenna, that is, a diameter area occupied by an element antenna, can be effectively reduced.

With reference to the first aspect, in some implementations of the first aspect, the antenna further includes a branch, and the branch is attached to the microstrip feeder.

Specifically, the branch and the microstrip feeder are located on the back of the first dielectric substrate.

The branch can effectively adjust impedance of the antenna in this embodiment of this application.

With reference to the first aspect, in some implementations of the first aspect, the first patch is circular or square.

With reference to the first aspect, in some implementations of the first aspect, the antenna further includes at least one feed point.

With reference to the first aspect, in some implementations of the first aspect, the open resonant ring is an annular open resonant ring.

With reference to the first aspect, in some implementations of the first aspect, a length of the microstrip feeder is between 0.1λ and 0.3λ; a radius of the hollow circle of the ground plate is between 0.1λ and 0.3λ; a radius difference between the open resonant ring and the hollow circle of the ground plate is between 0.01λ and 0.04λ, a ring width of the open resonant ring is between 0.01λ and 0.04λ, and an opening size of the open resonant ring is between 0.01λ and 0.04λ; and a size of the first patch is between 0.1λ and 0.3λ.

With reference to the first aspect, in some implementations of the first aspect, the first patch is a circular patch, and a thickness of the second dielectric substrate is between 0.01λ and 0.04λ; or the first patch is a square patch, and a thickness of the second dielectric substrate is between 0.01λ and 0.02λ.

According to a second aspect, an antenna system is provided. The antenna system includes the antenna according to any one of the first aspect and the possible implementations of the first aspect, and the antenna system further includes: a duplexer, configured to isolate a received signal from a sent signal; and a transceiver chip, configured to receive and transmit a dual-frequency band dual-circularly polarized signal.

DESCRIPTION OF EMBODIMENTS

The following describes technical solutions of this application with reference to accompanying drawings.

A space vehicle can receive a signal in any state through a circularly polarized antenna. Through the circularly polarized antenna, a flight device can not only reduce signal leakage and attenuation, but also eliminate polarization distortion caused by Faraday rotation in the ionosphere, thereby avoiding impact on reducing multipath fading in mobile communication in a polarization diversity manner.

In the field of satellite communication, a future development direction of a satellite terminal is lightweight and portable. This requires that a structure of a satellite terminal antenna develops towards a direction of a low-profile transmit/receive shared-aperture. However, a grating lobe easily occurs during high-band scanning of an antenna that supports dual-frequency band scanning and has a large spacing between high and low frequency bands. This affects overall system performance of the satellite terminal.

Figure 1:
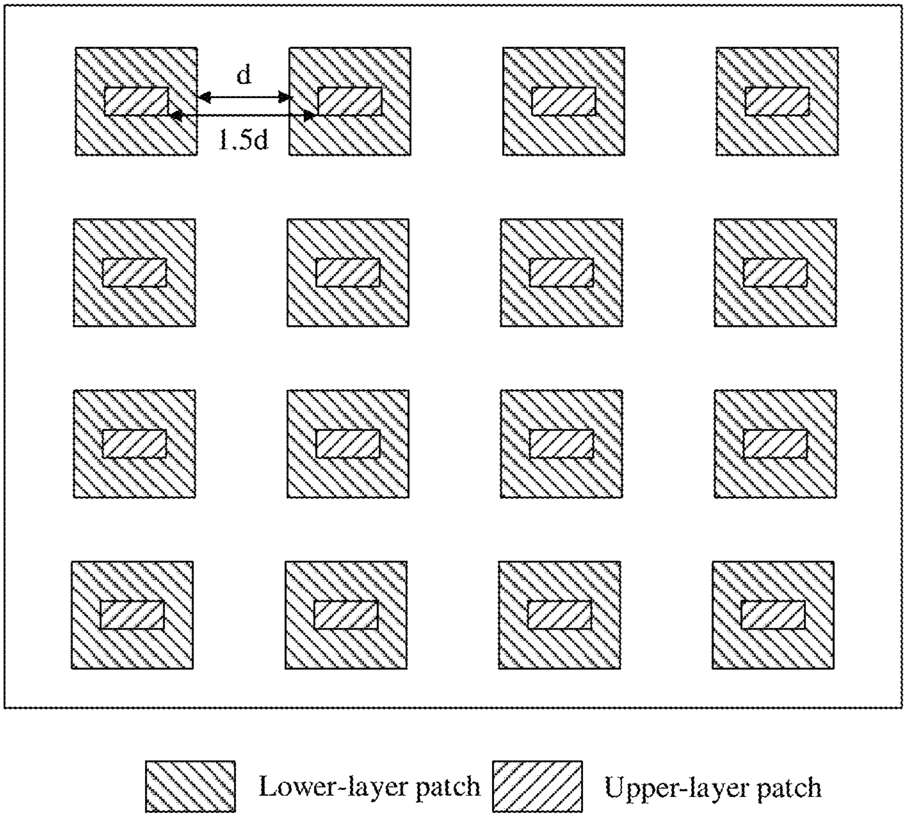
FIG. 1 is a schematic diagram of a structure of an example dual-layer dual-frequency band antenna.

Currently, there is a dual-layer dual-frequency antenna designed by using a dual-layer patch unit. A dual-layer dual-frequency antenna shown in FIG. 1 is designed by using a dual-layer patch. An upper-layer patch is configured to radiate a high frequency band (for example, 30 GHz), and a lower-layer patch is configured to radiate a low frequency band (for example, 20 GHz). When both the high frequency band and the low frequency band are scanned at a same beam direction angle, a unit distance between the upper-layer patches and a unit distance between the lower-layer patches are required to be different. For example, the unit distance (for example, d, as shown in FIG. 1) between the lower-layer patches is 1.5 times the unit distance (for example, 1.5d, as shown in FIG. 1) between the upper-layer patches.

Therefore, if all patches are arranged based on the unit distance between the upper-layer patches, wide-angle scanning of high and low frequency bands cannot be implemented simultaneously, and an array scanning angle of an antenna unit is reduced. In addition, at a same scanning angle, a grating lobe occurs during high-frequency band scanning, and consequently array performance is affected.

Specifically, array scanning performance that ensures that no grating lobe occurs needs to meet the following formula:

$$d < \frac{\lambda}{1 + |\sin\theta_0|}$$

λ is an operating wavelength of the antenna, d is a spacing between antenna units, and $\theta_0$ is a scanning angle. For array scanning performance, no grating lobe occurs when the foregoing formula is met. However, for scanning performance of a dual-frequency band array, when scanning angles are the same, if no grating lobe occurs on a high-frequency band antenna, a spacing between antenna units is required to be small, and a spacing between antenna units of a low-frequency antenna is required to be large. As a result, antenna design becomes more complex, to be specific, it is difficult to synchronously implement wide scanning angles at the high frequency band and the low frequency band.

In view of the foregoing technical problem, embodiments of this application provide a dual-frequency band dual-circularly polarized antenna and an antenna system, to increase an array scanning angle, reduce an antenna size, implement wide-angle scanning at a high frequency band and a low frequency band, and further implement a dual-frequency band dual-circularly polarization function on a premise of ensuring antenna scanning performance.

Figure 2:
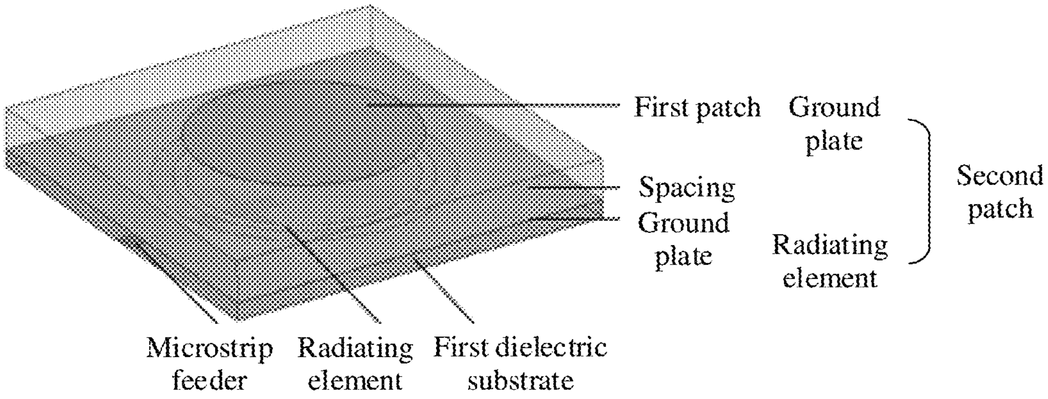
FIG. 2 is a schematic diagram of a three-dimensional structure of an example dual-frequency band dual-circularly polarized antenna according to an embodiment of this application.

FIG. 2 is a schematic diagram of a three-dimensional structure of an example dual-frequency band dual-circularly polarized antenna according to an embodiment of this application. The antenna includes:

- a first patch, configured to radiate a high-frequency signal;
- a second patch, including a radiating element and a ground plate, where the radiating element is configured to radiate a low-frequency signal, the ground plate includes a hollow circle, the radiating element is located in the hollow circle of the ground plate, and the radiating element is an open resonant ring;
- a first dielectric substrate, configured to place the second patch and a microstrip feeder; and
- the microstrip feeder.

It should be understood that the microstrip feeder is a segment of a microstrip cable that can connect a radio frequency port. In other words, the microstrip feeder may be understood as a segment of a cable for signal transmission. An antenna size is between 0.3λ×0.3λ×0.05λ and 0.4λ×0.4λ×0.1λ, and λ is a wavelength corresponding to a lowest operating frequency of the antenna.

Specifically, the first patch is above the second patch, there is a spacing between the first patch and the second patch, and the spacing between the first patch and the second patch may be air. In other words, there may be no dielectric substrate between the first patch and the second patch. The second patch is above the microstrip feeder, there is a spacing between the second patch and the microstrip feeder, the spacing between the second patch and the microstrip feeder is the first dielectric substrate, and the first dielectric substrate is configured to place the second patch and the microstrip feeder. Specifically, the second patch is located on a top layer of the first dielectric substrate, and the microstrip feeder is located on the back of the first dielectric substrate.

It should be understood that a shape of the first patch is not limited in this embodiment of this application, and the radiating element included in the second patch is the open resonant ring. A shape of the radiating element is not specifically limited in this embodiment of this application.

According to the foregoing three-layer antenna structure, specifically, the antenna includes the first patch, the second patch, and the microstrip feeder. The second patch includes the radiating element and the ground plate. The radiating element is located in the hollow circle included in the ground plate. The radiating element is the open resonant ring. There is the spacing between the first patch and the second patch. The spacing may be air or a specific dielectric substrate. There is the first dielectric substrate between the second patch and the microstrip feeder. The first dielectric substrate is configured to place the second patch and the microstrip feeder. A polarization direction is changed by adjusting an opening position of the open resonant ring, and different high and low frequency bands are obtained by adjusting a size of the open resonant ring. The antenna size is between 0.3λ×0.3λ×0.05, and 0.4λ×0.4λ×0.1λ, and λ is the wavelength corresponding to the lowest operating frequency of the antenna. In this way, this embodiment of this application can increase an array scanning angle, reduce an antenna size, implement wide-angle scanning at a high frequency band and a low frequency band, and implement a dual-frequency band dual-circularly polarization function on a premise of ensuring antenna scanning performance.

More specifically, in this embodiment of this application, only one antenna array plane (a shared-aperture) is used; and this reduces a size and a weight of an antenna system, and implements dual-frequency band wide-angle scanning and dual-circularly polarization reconfigurable.

It should be understood that, in this embodiment of this application, the radiating element of the second patch can generate self-resonance. Based on self-resonance of the radiating element of the second patch and couple with the first patch, this embodiment of this application supports generation of different high and low frequency bands. For example, a low frequency band is 20 GHz, and a high frequency band is 30 GHz. The generated high and low frequency bands are not specifically limited in this embodiment of this application.

It should be understood that the different high and low frequency bands can be generated in this embodiment of this application by adjusting an opening angle of the radiating element of the second patch, a size of the first patch, and a height between the first patch and the second patch.

It should be understood that an operating principle of implementing dual circular polarization of the antenna is as follows: A circular current formed between the radiating element of the second patch and the ground plate (or may be understood as an antenna ground) of the second patch can form circular polarization in one direction, and a direction of a current formed by the first patch is opposite to a direction of the current formed by the radiating element of the second patch. Therefore, circular polarization in another direction can be formed.

In a possible implementation, there is a second dielectric substrate between the first patch and the second patch.

More specifically, the second dielectric substrate is configured to place the first patch and the second patch, where the first patch is located at a top layer (upper side) of the second dielectric substrate, and the second patch is located at a bottom layer (lower side) of the second dielectric substrate.

It should be understood that the first dielectric substrate and the second dielectric substrate may be FR4, ceramic, low temperature co-fired ceramic (LTCC), or the like. Shapes of the first dielectric substrate and the second dielectric substrate are not specifically limited in this embodiment of this application.

It should be understood that, the microstrip feeder is disposed on the back of the first dielectric substrate, and therefore in this embodiment of this application, a signal can be coupled from the microstrip feeder to the radiating element of the second patch.

It should be understood that the radiating element of the second patch and the ground plate of the second patch may be located in different planes. For example, the radiating element may be thicker than the ground plate of the second patch, or the radiating element may be thinner than the ground plate of the second patch.

It should be understood that the radiating element may be a standard annular open resonant ring, or may be a non-standard annular open resonant ring. For example, the radiating element is an elliptical annular open resonant ring, or the radiating element may be another resonant ring structure, provided that the radiating element can form a ring current. A specific structure of the resonant ring is not limited in this embodiment of this application.

In a possible implementation, the antenna further includes a branch, and the branch is attached to the microstrip feeder.

It should be understood that, that the branch is attached to the microstrip feeder may be understood as follows: The branch may be located at an end of the microstrip feeder, and is perpendicular to the microstrip feeder, or may be at a specific cross angle to the microstrip feeder. It should be understood that the branch and the microstrip feeder are located on the back of the first dielectric substrate.

The branch can effectively adjust impedance of the antenna in this embodiment of this application.

In a possible implementation, the first patch is circular or square.

Specifically, when the first patch is circular, or when the first patch is square, in a possible implementation, a length of the feeder is between 0.1λ and 0.3λ, and a width of the microstrip feeder is determined by an impedance value 50 ohm, a thickness of the first dielectric substrate, and a dielectric constant. This is not limited in this embodiment of this application. A radius of the hollow circle is between 0.1λ and 0.3λ. A radius difference between the open resonant ring and the hollow circle is between 0.01λ and 0.04λ. A ring width of the open resonant ring is between 0.01λ and 0.04λ, and an opening size of the open resonant ring is between 0.01λ and 0.04λ. The size of the first patch is between 0.1λ and 0.3λ.

Figure 3:
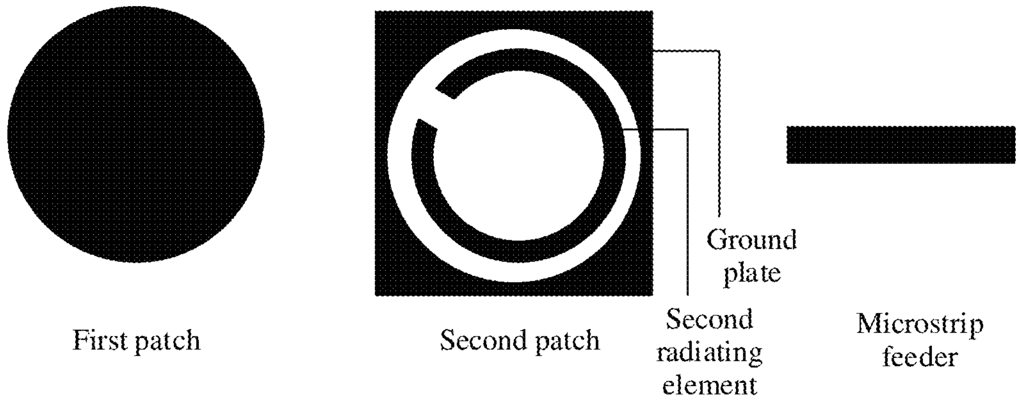
FIG. 3 is a schematic diagram of a planar structure of an example dual-frequency band dual-circularly polarized antenna according to an embodiment of this application.

FIG. 3 is a schematic diagram of an example planar structure of the dual-frequency band dual-circularly polarized antenna according to this embodiment. Details are shown in FIG. 3. The first patch shown in FIG. 3 is circular. However, a shape of the first patch is not specifically limited in this embodiment of this application. The radiating element of the second patch is the open resonant ring, and the open resonant ring shown in FIG. 3 is an annular open resonant ring. However, a shape of the open resonant ring is not specifically limited in this embodiment of this application. The microstrip feeder shown in FIG. 3 is a rectangular plane. However, a shape of the microstrip feeder is not specifically limited in this embodiment of this application.

Figure 4:
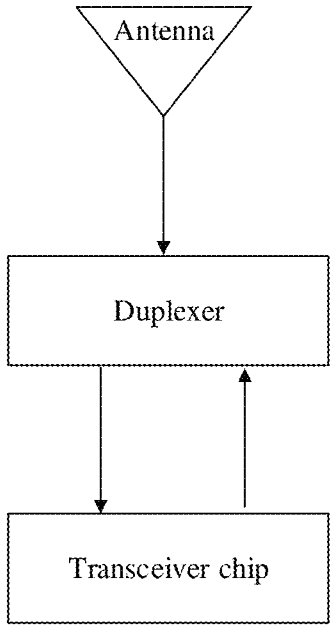
FIG. 4 is a schematic diagram of a structure of an example antenna system according to an embodiment of this application.

FIG. 4 is a schematic diagram of a structure of an example antenna system according to an embodiment of this application. Specifically, as shown in FIG. 4, the antenna system includes any one of the foregoing antennas, a duplexer, and a transceiver chip. The duplexer is configured to isolate a received signal from a sent signal, and the transceiver chip is configured to transmit and receive a dual-frequency dual-circularly polarized antenna.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in embodiments of this application may be integrated into one processing unit, each of the units may exist alone physically, or two or more units may be integrated into one unit.

The foregoing descriptions are merely non-limiting examples of specific implementations and are not intended to limit the protection scope, which is intended to cover any variation or replacement readily determined by a person of ordinary skill in the art. Therefore, the claims shall define the protection scope.

What is claimed is:

1. A dual-frequency band dual-circularly polarized antenna, comprising:
- a first patch, configured to radiate a high-frequency signal;
- a second patch, comprising a radiating element and a ground plate, wherein the radiating element is configured to radiate a low-frequency signal, the ground plate comprises a hollow circle, the radiating element is located in the hollow circle of the ground plate, and the radiating element is an open resonant ring;
- a microstrip feeder; and
- a first dielectric substrate, configured to place the second patch and the microstrip feeder, wherein
- the first patch is above and spaced apart from the second patch, and the second patch is above the microstrip feeder; and
- an antenna size is between 0.3λ×0.3λ×0.05, and 0.4λ×0.4λ×0.1λ, and λ is a wavelength corresponding to a lowest operating frequency of the antenna.

2. The antenna according to claim 1, further comprising:
- a second dielectric substrate, configured to place the first patch and the second patch.

3. The antenna according to claim 2, wherein the first patch is circular or square.

4. The antenna according to claim 2, wherein
- the first patch is a circular patch, and a thickness of the second dielectric substrate is between 0.01λ and 0.04λ; or
- the first patch is a square patch, and a thickness of the second dielectric substrate is between 0.01λ, and 0.02λ.

5. The antenna according to claim 1, further comprising:
- a branch attached to the microstrip feeder.

6. The antenna according to claim 1, further comprising at least one feed point.

7. The antenna according to claim 1, wherein the open resonant ring is an annular open resonant ring.

8. The antenna according to claim 7, wherein
- a length of the microstrip feeder is between 0.1λ and 0.3λ;
- a radius of the hollow circle of the ground plate is between 0.1λ and 0.3λ;
- a radius difference between the open resonant ring and the hollow circle of the ground plate is between 0.01λ and 0.04λ, a ring width of the open resonant ring is between 0.01λ and 0.04λ, and an opening size of the open resonant ring is between 0.01λ and 0.04λ; and
- a size of the first patch is between 0.1λ and 0.3λ.

9. An antenna system, comprising a dual-frequency band dual-circularly polarized antenna including:
- a first patch, configured to radiate a high-frequency signal;
- a second patch, comprising a radiating element and a ground plate, wherein the radiating element is configured to radiate a low-frequency signal, the ground plate comprises a hollow circle, the radiating element is located in the hollow circle of the ground plate, and the radiating element is an open resonant ring;
- a microstrip feeder; and
- a first dielectric substrate, configured to place the second patch and the microstrip feeder, wherein
- the first patch is above and spaced apart from the second patch, and the second patch is above the microstrip feeder; and
- an antenna size is between 0.3λ×0.3λ×0.05, and 0.4λ×0.4λ×0.1λ, and λ is a wavelength corresponding to a lowest operating frequency of the antenna, and
- wherein the antenna system further comprises:
- a duplexer, configured to isolate a received signal from a sent signal; and
- a transceiver chip, configured to receive and transmit a dual-frequency band dual-circularly polarized signal.

10. The antenna system according to claim 9, wherein the antenna further comprises:
- a second dielectric substrate, configured to place the first patch and the second patch.

11. The antenna system according to claim 10, wherein the first patch is circular or square.

12. The antenna system according to claim 10, wherein
- the first patch is a circular patch, and a thickness of the second dielectric substrate is between 0.01λ and 0.04λ; or
- the first patch is a square patch, and a thickness of the second dielectric substrate is between 0.01λ and 0.02λ.

13. The antenna system according to claim 9, wherein the antenna further comprises:
- a branch, wherein the branch is attached to the microstrip feeder.

14. The antenna system according to claim 9, wherein the antenna further comprises at least one feed point.

15. The antenna system according to claim 9, wherein the open resonant ring is an annular open resonant ring.

16. The antenna system according to claim 15, wherein
- a length of the microstrip feeder is between 0.1λ and 0.3λ;
- a radius of the hollow circle of the ground plate is between 0.1λ and 0.3λ;

a radius difference between the open resonant ring and the hollow circle of the ground plate is between 0.01λ and 0.04λ, a ring width of the open resonant ring is between 0.01λ and 0.04λ, and an opening size of the open resonant ring is between 0.01λ and 0.04λ; and a size of the first patch is between 0.1λ and 0.3λ.

* * * * *